United States Patent Office 3,306,945
Patented Feb. 28, 1967

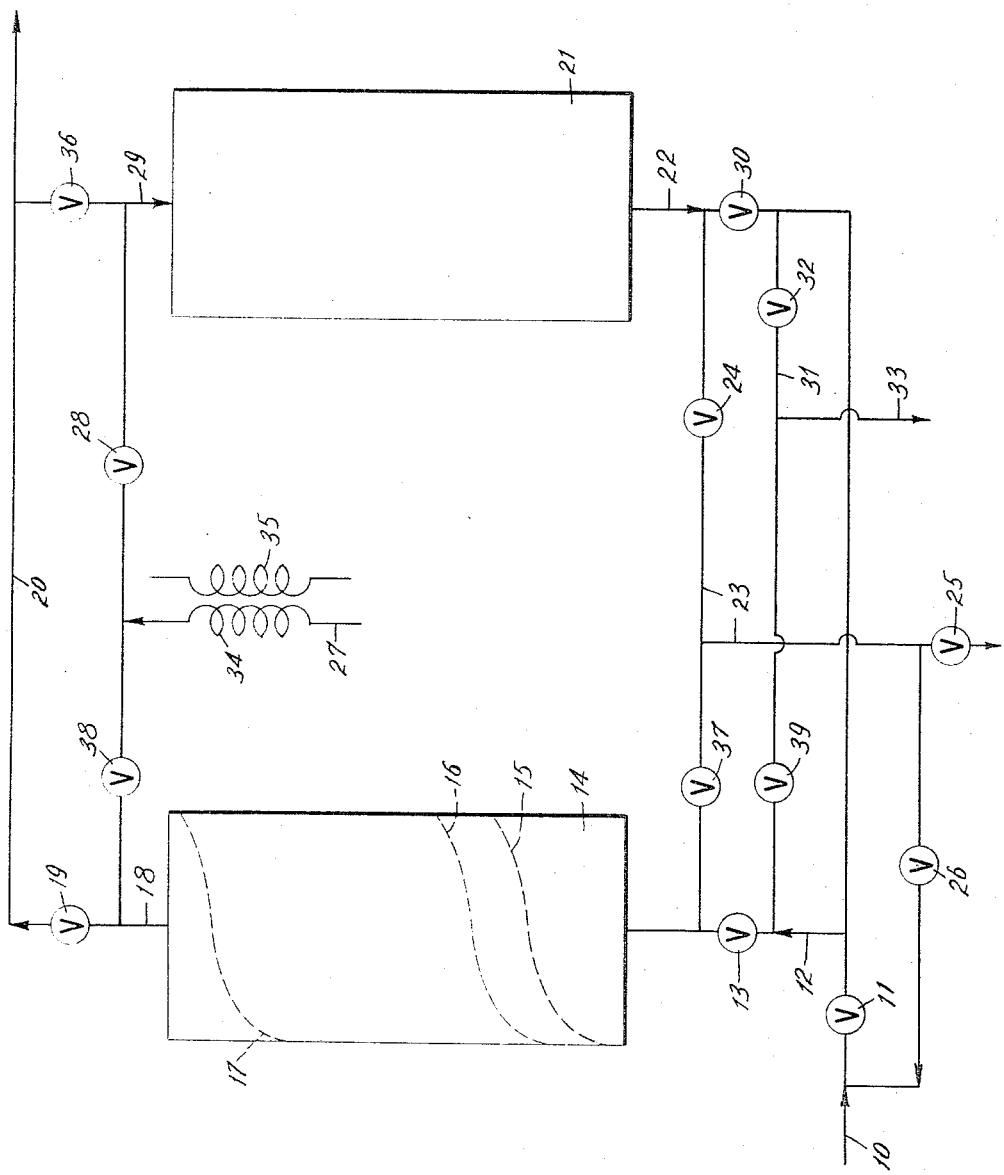

3,306,945
PURIFICATION OF UNSATURATED HYDROCARBONS BY ADSORPTION USING A MOLECULAR SIEVE ADSORBENT
Stephen A. Conviser, Houston, Tex., assignor to Union Carbide Corporation, a corporation of New York
Filed Mar. 11, 1964, Ser. No. 351,251
11 Claims. (Cl. 260—677)

This invention relates to a process for purifying liquid unsaturated hydrocarbons of impurities by molecular sieve materials which selectively adsorb both the unsaturate and the impurity, but have a stronger affinity for the latter.

It is well-known that unsaturated hydrocarbon feedstocks often contain impurities which have a detrimental effect in the intended use of the unsaturate. For example, impurities such as water and sulfur compounds are to be avoided in an alkylation reaction. The sulfur compounds are converted into sulfur oil and thereby consume the catalyst more rapidly than would otherwise occur.

Various processes have been proposed to remove such impurities, one of the most attractive being selective adsorption by crystalline zeolitic molecular sieves. These three-dimensional adsorbents are physically characterized by uniformly sized small pores leading from the exterior surface to an internal three-dimensional cagework formed of interconnected silica and alumina tetrahedra. Only about 1% of the available area of molecular sieves is on the outer surface, so that most of the adsorption occurs by passage of molecules through the pores into this inner cagework, and adsorption therein. This is in contrast to conventional adsorbents such as silica gel and activated charcoal which do not have large inner adsorption regions and consequently are characterized by lower adsorptive capacity. Molecular sieves have a particularly strong affinity for molecules which are unsaturated, polar or polarizable. For this reason, they selectively absorb olefins, acetylene and other unsaturated compounds, as well as polar compounds such as water, hydrogen sulfide and mercaptans.

The prior art has employed molecular sieves such as the large-pored zeolite X to selectively adsorb impurities such as water and sulfur compounds from unsaturated hydrocarbon containing streams. One reason why large pored molecular sieves have been employed is that the pores must be big enough to admit the relatively large mercaptan molecules. Otherwise the impurity is only surface adsorbed. Unfortunately the unsaturated compounds are also adsorbed by large-pored molecular sieve materials, as their critical molecular dimensions are often of the same order of magnitude as the impurities. Even though the unsaturated hydrocarbons having two to five carbon atoms per molecule are not as strongly adsorbed by molecular sieves as the aforementioned impurities, their coadsorption presents the problem of removal from the sieve when the adsorbent is loaded to the point of requiring desorption.

Many of the unsaturated hydrocarbons having two to five carbon atoms per molecule, e.g. ethylene, propylene, butylene and butadiene, are polymerized at relatively low temperature levels, e.g. 250° F. When polymerization occurs inside the inner cagework of a molecular sieve, the critical dimension of the polymer often becomes too large for easy passage out through relatively small pored molecular sieves, e.g., zeolite A, thereby precluding desorption. Furthermore the resulting polymers are not sufficiently volatile for desorption even from the large pored molecular sieves, e.g., zeolite X. Also, repeated cyclings between adsorption and desorption steps may convert the polymers into coke, thereby deactivating the molecular sieve and reducing its adsorptive capacity. As a consequence, the coadsorbed unsaturated light hydrocarbons may not be desorbed from the molecular sieve by simple heating.

In an effort to solve this problem, more strongly held polar material such as water has been used to displace the unsaturate. Although this keeps the temperature level sufficiently low to avoid polymerization of the unsaturate, a new problem of removing the strongly held water from the molecular sieve is created. Water desorption may be accomplished by limited heating below 700° F., but the required heat significantly increases the power costs of the process and may steam damage the sieves.

Another problem created by coadsorption of the unsaturate from the feedstock is initial warming of the reactivated molecular sieve bed due to the heat of adsorption. In some cases this bed warmup may be sufficient to polymerize the unsaturate and create the previously discussed problems.

An object of this invention is to provide an improved process for purifying a liquid unsaturated hydrocarbon compound having two to five carbon atoms per molecule by molecular sieve materials that selectively adsorb both the unsaturate and the impurity but have a stronger affinity for the latter.

Another object is to provide such a process that avoids polymerization of the unsaturate during desorption.

Still another object is to provide a process that avoids polymerization of the unsaturate in the molecular sieve by warmup due to the heat of adsorption.

A further object is to provide a process avoiding the need for desorption by water.

Other objects and advantages of this invention will be apparent from the ensuing specification and the single drawing which is a schematic flowsheet of the process for continuous purification of light hydrocarbon unsaturates.

According to one embodiment of the invention, a process is provided for purifying unsaturated hydrocarbon compounds having two to five carbon atoms per molecule in a liquid feed mixture also containing an impurity constituent being more strongly adsorbable than the unsaturate by activated crystalline zeolitic molecular sieve of sufficient pore size to receive the unsaturate and impurity constituents. At least one bed of the molecular sieve is provided an the liquid feed mixture is passed through the bed at substantially ambient temperature. As used herein, "substantially ambient temperature" contemplates a range of about 25° to 125° F.

The preferentially adsorbed impurity and the less strongly adsorbed unsaturate are coadsorbed, and a liquid effluent depleted of these constituents is discharged from an end of the bed. The coadsorption and discharge steps are continued thereby progressively displacing the less strongly adsorbed unsaturate by the more strongly adsorbed impurity from the feed end toward the discharge end until the bed is loaded to a desired extent. The hold-up liquid is then removed through the feed end of the bed, as for example by draining or by a purge gas piston effect.

Next, an aliphatic hydrocarbon purge gas having two to five carbon atoms per molecule is flowed from the discharge end through the bed at temperature below 250° F. thereby desorbing the unsaturate and the impurity. The purge gas is itself adsorbed by the molecular sieve, but less strongly than the unsaturate. It will be noted that the purge gas flow is in the opposite direction or countercurrent to the liquid feed mixture flow during the preceding adsorption step. This is to avoid the necessity of pushing the more strongly adsorbed impurity through a relatively long section of the bed, which requires increased quantity of purge. As the impurity and unsaturate are coadsorbed during the preceding adsorption step, adsorption fronts are established which extend laterally across the bed, with a leading edge and a trailing edge separated by a substantial distance which constitutes the length of the front. The less strongly held unsaturate front precedes the adsorption front of the more strongly held impurity and in some embodiments the latter progressively pushes the unsaturate front longitudinally through the bed toward the discharge end thereof. On termination of the adsorption step the unsaturate front leading edge is relatively near the discharge end if the bed is partially loaded, or may extend outside the bed if loaded to breakthrough. As used herein "breakthrough" refers to that point at which the concentration of a monitored adsorbable component materially increases in the fluid discharged from the bed.

At termination of the adsorption step, the impurity adsorption front is still behind the less strongly held unsaturate adsorption front and intermediate the feed inlet and discharge ends of the bed. However in many embodiments the unsaturate adsorption front has reached the exit end of the bed when the latter is completely filled with the feed liquid. If the purge gas flow were in the same direction as the liquid feed gas flow, i.e., concurrent, it would be necessary to force the entire quantity of adsorbed impurities through the unloaded section at the bed discharge end. By employing countercurrent purging, the impurities never contact this section and traverse only the impurity containing section of bed to the feed inlet end.

The purge gas flow is continued in sufficient quantity to load the bed with the purge material. Thereafter the adsorption step is started and the flow of liquid feed mixture is resumed through the cleaned preloaded bed thereby coadsorbing the impurity and unsaturate, and displacing the less strongly adsorbed purge gas for discharge through the opposite end of the bed.

One advantage of using the light aliphatic hydrocarbons as the purge gas is the ease of displacing same by the more strongly adsorbable unsaturate and impurity during the succeeding adsorption step. This may be accomplished without warmup, and the preloaded purge is simply removed with the first portion of liquid effluent. In most cases, the end use of the liquid effluent does not require separation of the aliphatic hydrocarbon purge gas. For example, when the liquid effluent is an impurity-free unsaturate to be used as feedstock for an alkylation process, purge components such as propane or butane do not adversely effect the alkylation catalyst.

This is in marked contrast to the previously proposed purification systems in which the strongly held purge medium such as water was difficult to remove, thereby requiring extreme conditions, e.g. elevated temperature and/or reduced pressure. The relative ease of removing the purge gas in this invention is attained without substantial warmup due to the heat of adsorption during the initial part of the adsorption. This is because the molecular sieve bed has been preloaded or preadsorbed with the purge gas, so that the tendency towards cooling by virtue of purge gas displacement by the more strongly adsorbed unsaturate and impurity components of the liquid feed substantially balances the warming effect of their adsorption.

Another embodiment of this invention relates to a process in which water and a second impurity such as a mercaptan are present in the unsaturated hydrocarbon-containing feed liquid, both impurities being more strongly adsorbable than the unsaturate. During the adsorption step, both of the impurities are adsorbed in preference to the unsaturate, and a two-step purge system is used. First the light aliphatic purge gas is flowed through the bed at relatively low temperature below 250° F. thereby desorbing the unsaturate and at least part of the impurities. The purge gas is itself adsorbed but less strongly than the unsaturate. The unsaturate-impurity-purge gas mixture is discharged from the liquid feed inlet end of the bed, and purge gas flow is continued through the bed at the relatively low temperature until the unsaturate is substantially completely desorbed. Thereafter the purge gas is flowed countercurrently through the bed at relatively high temperature between 250° and 700° F. for sufficient duration to substantially completely desorb the remainder of the impurities and discharge the impurity-containing purge gas from the bed liquid feed inlet end. It will be noted from this desorption that the bed temperature is maintained below about 250° F. until the unsaturates are removed, thus avoiding the previously described polymerization problem. Once unsaturate removal has been accomplished, it may be desirable to conduct the remainder of the desorption step at higher temperatures thereby accelerating the rate of impurity desorption and permitting earlier return of the bed to the adsorption step. This procedure is feasible because the water and other remaining impurities do not polymerize or otherwise exhibit a change-of-state in the temperature range of 250–700° F. At higher temperatures the water vapor impurity tends to damage the molecular sieve crystal structure and permanently reduce its adsorptive capacity.

After the impurities have been substantially completely removed from the molecular sieve at the relatively high temperature, the countercurent flow of purge gas at relatively low temperature below about 250° F. is continued to recool the bed and preload same with the light aliphatic gas. Preloading cannot be effected at the high temperature because the adsorptive capacity of molecular sieves in this thermal range is relatively low, so that very little preloading would be accomplished if the hot bed were directly returned to the adsorption step without purge gas recooling.

Among the unsaturates that may be purified by the instant process are those listed below. These compounds may form the major constituent of the liquid feedstock, or in any event be present in substantial quantities. Acetylene is not included because it is more strongly adsorbed than most of the impurities.

(1) Ethylene
(2) Propylene
(3) Butene (normal or iso)
(4) Pentene (normal or iso)
(5) Butadiene, pentadiene (isoprene, cyclopentadiene)

Selection of the less strongly adsorbed purge fluid as a practical matter is at least partially determined by availability at the plant site and whether the presence of the impurity in that purge stream is permissible, depending on the intended end use of the purge. Among the compounds to be considered for selection as the purge fluid are the following:

(1) Ethane
(2) Ethylene, propane
(3) Propylene, butane (normal or iso)
(4) Butene (normal or iso), pentane (normal or iso)
(5) Pentene (normal or iso)

The numbers assigned to the feed unsaturate and the purge fluids in the listings above may be used to aid in the selection of a suitable purge fluid for desorbing a particular feed unsaturate. The purge fluid should be that identified by the same or a lower number than that of the feed unsaturate. For example, if the unsaturate is isobutene, the less strongly held purge fluid could be propylene, propane, ethylene or ethane, or a combination thereof. As other exemplifications, the constituents may be as follows: unsaturated hydrocarbon-butadiene, impurity-acetylene, and purge gas-butene. Methane is not suitable as a purge gas because it is not adsorbed to an appreciable extent by molecular sieves at the temperatures of this process. On the other hand acetylene is not included because it is more strongly adsorbed than the unsaturates to be purified.

The impurities that may be found in the liquid feedstock and which are more strongly adsorbed than the unsaturated hydrocarbon include water, carbon dioxide, mercaptans (R—SH), hydrogen sulfide, disulfide compounds (R—S—S—R), sulfides (R—S—R), free elemental sulfur, acetylene compounds (HC≡CH, RC≡CH, and the like), alkylene oxides, organic acids, aldehydes, ketones, alcohols, ethers, and unsaturated hydrocarbons having a higher molecular weight or being more unsaturated than the feed unsaturate. The major impurities are likely to be mercaptans, acetylenic compounds, or unsaturates.

The zeolitic molecular sieve used as the selective adsorbent in the instant process must have sufficiently large pores to admit the impurities. For this reason, zeolites such as the synthetic types X, Y and L and the naturally occurring faujasite are preferred because of their relatively large pore sizes, i.e., greater than 6 Angstroms. They may be used for purifying any of the liquid unsaturated hydrocarbons and any of the suggested purge fluids may be employed. Smaller pores molecular sieves such as the synthetic types D, R and T and the naturally occurring chabazite, erionite, analcite and clinoptilolite are useful in purifying the straight-chain unsaturates. In this instance a straight chain purge fluid would be selected. Other molecular sieve-type compounds include the synthetic mordenite material described in Belgian Patent No. 626,790.

Zeolite A may be represented by the formula:

$$1.0 \pm 0.2 M_{2/n}O : Al_2O_3 : 1.85 \pm 0.5 SiO_2 : yH_2O$$

wherein M represents a metal, $n$ is the valence of M, and $y$ may have any value up to about 6. The as-synthesized zeolite A contains primarily sodium ions and is designated sodium zeolite A. Zeolite A is described in more detail in U.S. Patent No. 2,882,243 issued April 14, 1959.

Zeolite T is a synthetic crystalline zeolite molecular sieve whose composition may be expressed in terms of oxide mole ratios as follows:

$$1.1 \pm 0.4[xNa_2O : (1-x)K_2O] : Al_2O_3 : 6.9 \pm 0.5 SiO_3 : yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952, issued August 30, 1960.

Zeolite X is a synthetic crystalline zeolitic molecular sieve which may be represented by the formula:

$$0.9 \pm 0.2 M_{2/n}O : Al_2O_3 : 2.5 \pm 0.5 SiO_2 : yH_2O$$

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244 issued April 14, 1959.

Zeolite Y is described and claimed in U.S. Patent Application Serial No. 109,487 filed May 12, 1961 in the name of D. W. Breck.

Zeolite L is described and claimed in U.S. Patent Application Serial No. 214,479 filed August 3, 1962, in the names of D. W. Breck and N. A. Acara.

Zeolite D is described and claimed in U.S. Patent Application Serial No. 273,549 filed April 17, 1963, in the names of D. W. Breck and N. A. Acara.

The invention will be more clearly understood by reference to the single figure in which two beds of crystalline sodium zeolite X are provided and piped in parallel flow relation so that one bed is always on the adsorption step and the other bed is either being purged or recooled for return to the adsorption step. In this manner, a continuous supply of impurity-free unsaturate product is available. If only intermittent flow of product is required a single bed may be preferable.

A typical liquid feedstock to be purified for use in an alkylation process may contain 68% by volume normal and isobutane, 32% butylenes, 225 p.p.m. methyl mercaptan and 100 p.p.m. water. This feedstock is introduced through conduit 10 and inlet valve 11 at 100° F. and 100 p.s.i.a., and directed through branch conduit 12 having control valve 13 therein to the lower end of first molecular sieve bed 14. This bed has previously been cleaned of the butylene, methyl mercaptan and water, and is preloaded with n-butane gas at about 100° F. and 40 p.s.i.a. The liquid feedstock passes upwardly through first bed 14 and progressively displaces the n-butane preloaded purge gas without appreciable warmup.

The butylene, water and methyl mercaptan are coadsorbed in bed 14, and adsorption fronts for each of these compounds are established and move longitudinally upward through the bed from the inlet lower end toward the discharge upper end. As depicted, the butylene front 17 is the farthest forward and usually moves out of the bed during filling of same with the feed liquid. Front 17 is followed by the methyl mercaptan front 16 and water front 17, indicating progressively stronger adsorptivity by the sodium zeolite X. The sweetened and dried liquid product containing less than 1 p.p.m. methyl mercaptan and less than 1 p.p.m. water is discharged from the upper end of branch conduit 18, through control valve 19 to product conduit 20 for flow to an alkylation unit, or a liquid storage tank.

When the first bed 14 is loaded with methyl mercaptan and water impurities to the desired extent, the flow of liquid feedstock is terminated by closing control valve 13. This point of operation may for example be determined by monitoring the methyl mercaptan concentration in discharge conduit 18 and switching flows between first bed 14 and second bed 21 when this concentration rises appreciably above 1 p.p.m.

During the period first bed 14 is on the adsorption step, second bed 21 has been purged and preloaded with the n-butane gas preparatory for return to the adsorption step. To accomplish this, the liquid holdup in second bed 21 is removed by draining through the lower end into branch conduit 22 and flow through connecting drain conduit 23 having control valve 24 therein. The holdup liquid may either be discharged through drain valve 25 or recycled through control valve 26 for return to the liquid feed conduit 10. If simple gravity draining is unsatisfactory, the removal of holdup liquid from adsorbate-loaded second bed 21 may be accelerated by introduction of n-butane purge gas at for example 100° F. and 40 p.s.i.a. through supply conduit 27 and control valve 28 therein to conduit 29 at the upper end of second bed 21. This purge gas forces holdup liquid, perhaps still with substantial quantities of impurities, downwardly through conduit 22 and conduit 23 in the previously described manner.

When the holdup liquid has been substantially completely removed from second bed 21, n-butane purge gas flow continues downwardly through bed 21. The normal butylene adsorbate is released from the molecular sieve along with at least part of the more strongly held methyl mercaptan and water impurities. The n-butane is simultaneously preloaded on the purged portion of second bed 21, thereby replacing the n-butylene and impurities. The normal butylene-methyl mercaptan-water-normal butane gas mixture is discharged from the lower end of second bed 21 into conduit 22 having opened control valve 30 therein and thence to connecting purge gas conduit 31 having control valve 32. The purge gas effluent mixture is then discharged through conduit 33 for use as desired.

If one wishes to accelerate the rate of desorption after the normal butylene adsorbate has been purged from second bed 21, the n-butane purge gas in conduit 27 may be heated to a temperature below 700° F. in coils 34 by a hot fluid passing through coils 35 in heat exchanging relation. The hot purge gas then progressively flows through conduit 29, second bed 21, conduit 22, connecting conduit 31 and discharge conduit 33 as previously described.

The adsorbent bed being purged may also be heated by means embedded in the chamber, either separately or in combination with preheating of the purge gas. For example, steam coils or electrical resistors may be distributed throughout the bed for substantially uniform heating of the molecular sieve adsorbent particles.

When the heated second bed 21 is substantially completed freed of the methyl mercaptan and water impurities, it must be recooled to a sufficiently low temperature for preloading by the n-butane purge gas. This may be accomplished by discontinuing preheating of the purge in conduit 27, and/or terminating internal heating of the second adsorbent chamber. Alternatively, liquid n-butane may be introduced to the upper end of the hot bed through conduit 27.

Switchover of first adsorbent bed 14 to the purge step and second adsorbent bed 21 to the adsorption step may be accomplished by adjustment of valves in a manner well-known to those of ordinary skill. The liquid feed passes upwardly through conduit 22 and control valve 30 therein for flow through second bed 21 and adsorption of n-butylene, methyl mercaptan and water by the sodium zeolite X. The depleted liquid effluent is discharged from the upper end of second bed 21 into conduit 29 and passed through control valve 36 for exit from the system in conduit 20.

The holdup liquid in first adsorbent bed 14 is drained through conduit 12 and branch conduit 23 having control valve 37 for processing as previously described. The n-butane purge gas is introduced to first bed 14 through opened control valve 38 into the upper end for downward flow, desorption of the adsorbate and discharge through conduit 12 to branch conduit 31 having control valve 39 therein.

Although two beds are illustrated in FIG. 1, the same sequence of steps may be practiced in a single bed with intermittent product flow, or with more than two beds. For example in one large unit sized to process 8,000 barrels per day of liquid feedstock having the same composition as described in conjunction with FIG. 1, six beds could be used in sets of three on parallel flow. The adsorbent chambers might be 2.5 feet I.D. x 15 feet long, each containing 3,500 pounds $\frac{1}{16}$-inch diameter clay-bonded sodium zeolite X pellets. A suitable operating cycle is as follows to produce a liquid effluent containing less than 1 p.p.m. methyl mercaptan and less than 1 p.p.m. H$_2$O:

adsorbed impurity and the less strongly adsorbed unsaturate; discharging a liquid effluent from the exit end of the bed being depleted of the impurity and unsaturate, and continuing the coadsorption and discharge steps thereby progressively displacing the less strongly adsorbed unsaturate by the more strongly adsorbed impurity from the inlet end toward the exit end until the bed is loaded with impurity to a desired extent; removing the holdup liquid through the inlet end of said bed; flowing aliphatic hydrocarbon purge gas having two to five carbon atoms per molecule from the exit end through said bed at temperature below 250° F. thereby desorbing said unsaturate and impurity, said purge gas being itself adsorbed less strongly by the molecular sieve than the unsaturate; discharging the unsaturate-impurity-purge gas of said purge gas mixture from the inlet end of said bed, and continuing the flow of said purge gas through said bed in sufficient quantity to preload the bed; thereafter resuming the flow of liquid feed mixture to the inlet end through the cleaned preloaded bed thereby coadsorbing said impurity and unsaturate, and displacing the less strongly adsorbed purge gas for discharge through the exit end of the bed.

2. A process for purifying unsaturated hydrocarbon compounds having two to five carbon atoms per molecule in a liquid feed mixture also containing an impurity constituent being more strongly adsorbable than the unsaturate by activated crystalline zeolitic molecular sieve of greater than 6 angstrom pore size, which process comprises the steps of providing at least one bed of said molecular sieve and passing said liquid feed mixture through said bed at substantially ambient temperature and coadsorbing the preferentially adsorbed impurity and the less strongly adsorbed unsaturate; discharging a liquid effluent from the exit end of the bed being depleted of the impurity and unsaturate, and continuing the coadsorption and discharge steps thereby progressively displacing the less strongly adsorbed unsaturate by the more strongly adsorbed impurity from the inlet end toward the upper end until the bed is loaded with impurity to a desired extent; removing the holdup liquid through the inlet end of said bed; flowing aliphatic hydrocarbon purge gas having two to five carbon atoms per molecule from the exit end through said bed at temperature below 250° F. thereby desorbing said unsaturate and impurity, said purge gas being itself adsorbed less strongly by the molecular sieve than the unsaturate; discharging the unsaturate-impurity-purge gas mixture from the inlet end of said bed, and

| Step | Time, hrs. | Flow Rate | Temp., ° F. | Pressure, p.s.i.a. | Direction | Composition |
| --- | --- | --- | --- | --- | --- | --- |
| Sweeten and Dry | 6 | 8,000 bbl./day | 100 | 100 | Up | Butane, 68 mol percent; Butylene, 32%; CH$_3$SH, 225 p.p.m. H$_2$O, 100 p.p.m. Feed. |
| Drain Liquid | 0.5 | 45 bbl./hr | 100 | 100 | Down | |
| Displace | 4.5 | 110,000 s.c.f.h | 150 | 80 | do | n-Butane gas. |
| Butylene | 4.5 | | | | | Do. |
| Hot Purge | | 110,000 s.c.f.h | 400 | 80 | do | Do. |
| Cool and Preload | 1.0 | 83 bbl./hr | | 80 | do | n-Butane liquid. |

Although preferred embodiments of this invention have been described in detail, it is contemplated that modifications of the process may be made and that some features may be employed without others, all within the scope of the invention.

What is claimed is:
1. A process for purifying unsaturated hydrocarbon compounds having two to five carbon atoms per molecule in a liquid feed mixture also containing an impurity constituent being more strongly adsorbable than the unsaturate by activated crystalline zeolitic molecular sieve of sufficient pore size to receive the unsaturate and impurity constituents, which process comprises the steps of providing at least one bed of said molecular sieve and passing said liquid feed mixture through said bed at substantially ambient temperature and coadsorbing the preferentially continuing the flow of said purge gas through said bed in sufficient quantity to preload the bed; thereafter resuming the flow of liquid feed mixture to the inlet end through the cleaned preloaded bed thereby coadsorbing said impurity and unsaturate, and displacing the less strongly adsorbed purge gas for discharge through the exit end of the bed.

3. A process according to claim 2 in which said impurity constituents is a sulfur compound.

4. A process according to claim 2 in which said impurity constituent is water.

5. A process according to claim 1 in which said unsaturated hydrocarbon compound is butadiene, said impurity constituent is acetylene and said purge gas is butylene.

6. A process according to claim 2 in which said unsaturated hydrocarbon compound is ethylene and said purge gas is propane.

7. A process according to claim 2 in which said unsaturated hydrocarbon compound is butylene, said impurity constituent is a mercaptan compound and said purge gas is n-butane.

8. A process according to claim 1 in which the purging step is at higher temperature than the adsorption step.

9. A process for purifying unsaturated hydrocarbon compounds having two to five carbon atoms per molecule in a liquid feed mixture also containing water and a second impurity constituent being more strongly adsorbable than the unsaturate by activated crystalline zeolitic molecular sieve of sufficient pore size to receive the unsaturate and the impurity constituents, which process comprises the steps of providing at least one bed of said molecular sieve and passing said liquid feed mixture through said bed at substantially ambient temperature and coadsorbing the preferentially adsorbed impurities and the less strongly adsorbed unsaturate; discharging a liquid effluent from the exit end of the bed being depleted of the impurities and unsaturate, and continuing the coadsorption and discharge steps thereby progressively displacing the less strongly adsorbed unsaturate by the more strongly adsorbed impurities from the inlet end toward the exit end of the bed until the bed is loaded with impurity to a desired extent; removing the holdup liquid through the inlet end of the bed; flowing aliphatic hydrocarbon purge gas having two to five carbon atoms per molecule from the exit end through said bed at relatively low temperature below 250° F. thereby desorbing said unsaturate and at least part of said impurities, said purge gas being itself adsorbed less strongly by the molecular sieve than the unsaturate; discharging the unsaturate-impurity-purge gas mixture from the inlet end of said bed, and continuing the flow of said purge gas through the bed at said relatively low temperature until said unsaturate is substantially completely desorbed therefrom; thereafter flowing said purge gas from the exit end through said bed at relatively high temperature between 250° and 700° F. for sufficient duration to substantially completely desorb the remainder of said impurities and discharge the impurity-containing purge gas from the bed inlet end; thereafter still continuing the flow of said purge gas through said bed at relatively low temperature below 250° F. to recool the bed and preload same with the straight chain aliphatic purge gas; resuming the flow of liquid feed mixture to the inlet end through the cleaned preloaded bed thereby coadsorbing said impurities and unsaturate, and displacing the less strongly adsorbed purge gas for discharge through the exit end of the bed.

10. A process for purifying unsaturated hydrocarbon compounds having two to five carbon atoms per molecule in a liquid feed mixture also containing an impurity constituent being more strongly adsorbable than the unsaturate by activated crystalline zeolitic molecular sieve of sufficient pore size to receive the unsaturate and impurity constituents, which process comprises the steps of providing at least two beds of said molecular sieve and passing said liquid feed mixture through a first bed at substantially ambient temperature and coadsorbing the preferentially adsorbed impurity and the less strongly adsorbed unsaturate; discharging a liquid effluent from the exit end of the first bed being depleted of the impurity and unsaturate, and continuing the coadsorption and discharge steps thereby progressively displacing the less strongly adsorbed unsaturate by the more strongly adsorbed impurity from the inlet end toward the exit end until the bed is loaded with impurity to a desired extent; simultaneously flowing aliphatic hydrocarbon purge gas having two to five carbon atoms per molecule from the exit end through the second bed at temperature below 250° F. thereby desorbing said unsaturate and impurity previously adsorbed therein; discharging the unsaturate-impurity-purge gas mixture from the inlet end of said second bed, and continuing the flow of said purge gas through said bed in sufficient quantity to preload the bed, periodically removing the holdup liquid through the inlet end of said first bed and switching the liquid feed mixture and purge gas flows between the first and second beds thereby passing said liquid feed mixture to the inlet end through the cleaned preloaded second bed at substantially ambient temperature to coadsorb said impurity and unsaturate, and passing said purge gas from the inlet end through the first bed at temperature below 250° F. to desorb said unsaturate and impurity.

11. A process according to claim 1 in which said holdup liquid is removed through the inlet end of said bed by flowing said purge gas from the exit end through the bed at temperature below 250° F.

References Cited by the Examiner
UNITED STATES PATENTS

| | | | |
|---|---|---|---|
| 3,063,934 | 11/1962 | Epperly et al. | 260—677 |
| 3,094,569 | 6/1963 | Thomas | 260—677 |
| 3,188,293 | 6/1965 | Bacon et al. | 208—310 |
| 3,209,050 | 9/1965 | Hanson | 260—681.5 |
| 3,211,644 | 10/1965 | Clark | 208—310 |

ALPHONSO D. SULLIVAN, *Primary Examiner.*